United States Patent
Nagasawa

(12) 
(10) Patent No.: US 11,084,452 B2
(45) Date of Patent: Aug. 10, 2021

(54) PASSENGER PROTECTION APPARATUS

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 107 days.

(21) Appl. No.: 16/432,103

(22) Filed: Jun. 5, 2019

(65) Prior Publication Data
US 2020/0101930 A1 Apr. 2, 2020

(30) Foreign Application Priority Data
Sep. 28, 2018 (JP) .............................. JP2018-185723

(51) Int. Cl.
*B60R 21/237* (2006.01)
*B60R 21/231* (2011.01)
(Continued)

(52) U.S. Cl.
CPC .......... *B60R 21/237* (2013.01); *B60R 21/207* (2013.01); *B60R 21/2155* (2013.01);
(Continued)

(58) Field of Classification Search
CPC ... B60R 21/237; B60R 21/207; B60R 21/231; B60R 2021/23146; B60R 21/23184;
(Continued)

(56) References Cited

U.S. PATENT DOCUMENTS 3,981,518 A * 9/1976 Pulling ................ B60N 2/4221
280/730.1
5,333,899 A * 8/1994 Witte ................ B60R 21/23138
280/728.1
(Continued)

FOREIGN PATENT DOCUMENTS

CN 111819113 A * 10/2020 ......... B60R 21/2338
FR 2927592 A1 8/2009
(Continued)

OTHER PUBLICATIONS

Japanese Office Action dated Sep. 17, 2019 for Japanese Patent Application No. 2018-185723 (4 pages in Japanese with English Translation).
(Continued)

*Primary Examiner* — Paul N Dickson
*Assistant Examiner* — Daniel M. Keck
(74) *Attorney, Agent, or Firm* — Smith, Gambrell & Russell, LLP

(57) ABSTRACT

A passenger protection apparatus includes an inflator and an airbag body. The inflator is configured to generate gas upon receiving a predetermined actuating signal. The airbag body is folded and configured to deploy by supplying the gas from the inflator to the airbag body. The airbag body includes an predetermined area on which adhesive is applied. The predetermined area adheres to an adherend when the airbag body is deployed. When the airbag body is not deployed, the airbag body is stored in a deflated and bound state, and a surface facing the predetermined area when the airbag body is stored is a peel-off surface on which an adhesive force of the adhesive is lost.

13 Claims, 10 Drawing Sheets

(51) Int. Cl.
  *B60R 21/207* (2006.01)
  *B60R 21/00* (2006.01)
  *B60R 21/264* (2006.01)
  *B60R 21/2155* (2011.01)
  *B60R 21/26* (2011.01)

(52) U.S. Cl.
  CPC .......... *B60R 21/231* (2013.01); *B60R 21/264* (2013.01); *B60R 2021/0004* (2013.01); *B60R 2021/23146* (2013.01); *B60R 2021/26029* (2013.01)

(58) Field of Classification Search
  CPC .. B60R 2021/2358; B60R 2021/23595; B60R 2021/23107; B60R 21/233
  See application file for complete search history.

(56) References Cited

U.S. PATENT DOCUMENTS

| | | | |
|---|---|---|---|
| 5,499,840 A | | 3/1996 | Nakano |
| 6,247,727 B1 * | | 6/2001 | Hamada ............... B60R 21/2171 |
| | | | 280/743.1 |
| 7,134,685 B2 * | | 11/2006 | Panagos ................ B60R 21/201 |
| | | | 280/730.2 |
| 7,163,236 B2 | | 1/2007 | Masuda et al. |
| 7,571,931 B2 | | 8/2009 | Watanabe |
| 7,681,907 B2 | | 3/2010 | Svenbrant et al. |
| 8,882,138 B1 * | | 11/2014 | Hicken ................ B60R 21/231 |
| | | | 280/730.1 |
| 9,290,151 B2 | | 3/2016 | Fujiwara |
| 9,428,136 B2 | | 8/2016 | Ishida et al. |
| 9,487,177 B2 * | | 11/2016 | Schneider ............. B60R 21/231 |
| 9,731,677 B1 | | 8/2017 | Belwafa et al. |
| 9,862,347 B2 | | 1/2018 | Deng et al. |
| 9,975,519 B2 | | 5/2018 | Kobayashi |
| 10,246,043 B2 | | 4/2019 | Schneider |
| 10,300,880 B2 | | 5/2019 | Mihm |
| 10,800,368 B2 | | 10/2020 | Kitagawa |
| 10,875,486 B2 | | 12/2020 | Kim |
| 2004/0232681 A1 | | 11/2004 | Adomeit |
| 2005/0121889 A1 * | | 6/2005 | Enders ................ B60R 21/2035 |
| | | | 280/731 |
| 2006/0255572 A1 * | | 11/2006 | Svenbrandt ........... B60R 21/233 |
| | | | 280/730.2 |
| 2007/0013177 A1 | | 1/2007 | Abe |
| 2016/0039383 A1 * | | 2/2016 | Hicken ................ B60R 21/2338 |
| | | | 280/729 |
| 2016/0288762 A1 | | 10/2016 | Deng et al. |
| 2017/0355342 A1 | | 12/2017 | Deng et al. |
| 2018/0056920 A1 | | 3/2018 | Paxton et al. |
| 2018/0162310 A1 * | | 6/2018 | Szawarski ............. B60R 21/231 |
| 2018/0222432 A1 * | | 8/2018 | Schneider ............. B60R 21/261 |
| 2019/0023214 A1 * | | 1/2019 | Kitagawa ............. B60R 21/237 |
| 2019/0283703 A1 | | 9/2019 | Marciniak |
| 2019/0389420 A1 | | 12/2019 | Dry et al. |
| 2020/0101921 A1 | | 4/2020 | Nagasawa |
| 2020/0101927 A1 | | 4/2020 | Nagasawa |
| 2020/0101931 A1 | | 4/2020 | Nagasawa |

FOREIGN PATENT DOCUMENTS

| | | | | |
|---|---|---|---|---|
| JP | H07-232615 | | 9/1995 | |
| JP | H07-246898 | | 9/1995 | |
| JP | 2007-022306 A | | 2/2007 | |
| JP | 2009-154812 A | | 7/2009 | |
| JP | 2010-047182 | | 3/2010 | |
| JP | 2010132268 A | * | 6/2010 | ........... B60R 21/235 |
| JP | 2013-018378 | | 1/2013 | |
| JP | 2015-112973 | | 6/2015 | |

OTHER PUBLICATIONS

Non-Final Office Action dated Mar. 19, 2021 in U.S. Appl. No. 16/445,345 (9 pages).

Final Office Action dated Apr. 2, 2021 in U.S. Appl. No. 16/411,295 (7 pages).

* cited by examiner

PASSENGER PROTECTION APPARATUS

CROSS-REFERENCE TO RELATED APPLICATIONS

The present application claims priority from Japanese Patent Application No. 2018-185723 filed on Sep. 28, 2018, and the entire contents of which are hereby incorporated by reference.

BACKGROUND

The disclosure relates to a passenger protection apparatus.

In order to protect a passenger from a collision and so forth, an airbag apparatus has been used in a vehicle such as an automobile. As this airbag apparatus, a front airbag configured to deploy backward in front of the passenger has been known. This front airbag is deployed at a frontal collision of the vehicle to support and protect the passenger moving forward.

In addition, in order to protect against a side collision, there is an increasing demand for vehicles equipped with side airbags and curtain airbags. This curtain airbag is used to hold the internal pressure for a period of time, several seconds while the vehicle overturns, in order to absorb the impact to the head, and therefore there is a demand for improvement of the airtightness of the airbag and lengthen the expansion duration of the airbag. To address this demand, an airbag having improved strength and airtightness of a joined part with adhesive has been proposed, for example, in Japanese Unexamined Patent Application Publication No. 2010-047182. In addition, a technology of changing the adhesive strength of an adhesive layer for each region has been proposed, for example, in Japanese Unexamined Patent Application Publication No. 2015-112973. Here, the adhesive strength is changed for each region by, for example, changing the number of times at which adhesive is applied.

SUMMARY

An aspect of the disclosure provides a passenger protection apparatus. The apparatus includes an inflator and an airbag body. The inflator is configured to generate gas upon receiving a predetermined actuating signal. The airbag body is folded and configured to deploy by supplying the gas from the inflator to the airbag body. The airbag body includes an predetermined area on which adhesive is applied. The predetermined area adheres to an adherend when the airbag body is deployed. When the airbag body is not deployed, the airbag body is stored in a deflated and bound state, and a surface facing the predetermined area when the airbag body is stored is a peel-off surface on which an adhesive force of the adhesive is lost.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Figure 1:
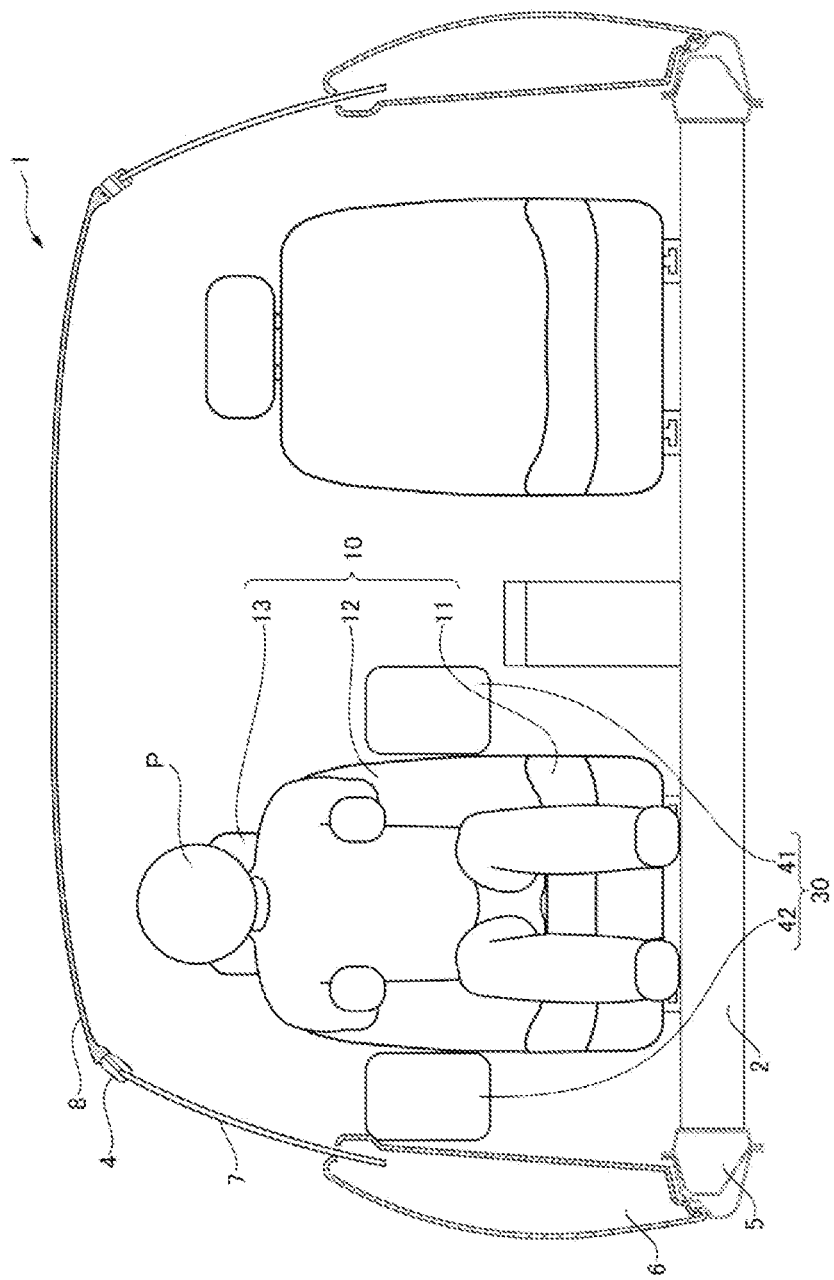
FIG. 1 is a cross-sectional view schematically illustrating a vehicle equipped with passenger protection apparatuses according to an embodiment of the disclosure.

In the following, a preferred but non-limiting embodiment of the disclosure is described in detail with reference to the accompanying drawings. Note that sizes, materials, specific values, and any other factors illustrated in the embodiment are illustrative for easier understanding of the disclosure, and are not intended to limit the scope of the disclosure unless otherwise specifically stated. Further, elements in the following example embodiment which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale.

Collisions of the vehicle are not limited to a frontal collision and a lateral collision, but various types of collisions in any direction, such as an oblique collision, are conceivable. However, it may not be possible to prepare airbags for each type of collision, because of the high cost and so forth. For example, the motion of the passenger is varied depending on the various types of collisions as described above, and therefore it is difficult for the airbag to surely hold the passenger in an exact contact area that allows the airbag to maximally absorb the collision energy. Consequently, it may not be possible to successfully protect the passenger.

It is desirable to provide a passenger protection apparatus capable of improving the protection performance by surely holding the passenger regardless of varied motions of the passenger due to various types of collisions. Also it is desirable to provide a passenger protection apparatus capable of successfully deploy an airbag when adhesive is used to hold the passenger.

Figure 2A:
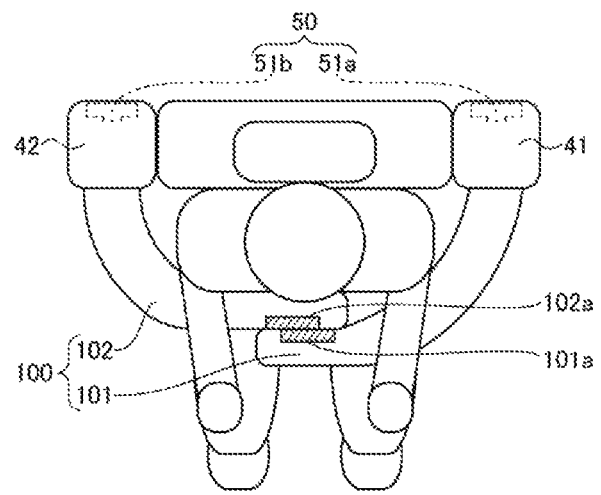
FIG. 2A is a top view illustrating a deployed airbag body of each of the passenger protection apparatuses according to the embodiment.
Figure 2B:
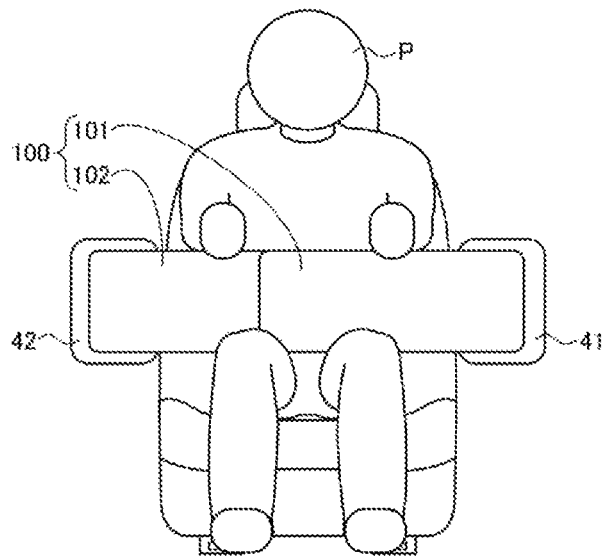
FIG. 2B is a front view illustrating a deployed airbag body of each of the passenger protection apparatuses according to the embodiment.

FIG. 1 is a cross-sectional view schematically illustrating a vehicle equipped with passenger protection apparatuses according to an embodiment of the disclosure. FIG. 2A is a top view illustrating airbag bodies deployed by actuating the passenger protection apparatuses of the embodiment. FIG. 2B is a front view illustrating the airbag bodies deployed by actuating the passenger protection apparatuses of the embodiment.

<Configuration of Vehicle 1>

As illustrated in FIG. 1, seats 10 are provided on a floor surface 2 (on which a floor panel of an under body is mounted) of a vehicle 1. In addition, right and left center pillars forming inside walls of the vehicle body are provided facing one another outside the floor surface 2 in the vehicle width direction. The upper end of each of the center pillars is integrally coupled to a roof side rail 4, and the lower end of the center pillar is integrally coupled to a side sill 5. A front door 6 is provided in front of the center pillar, and a front door window 7 is provided above the front door 6. Moreover, a roof 8 is provided approximately horizontally above the roof side rails 4.

A passenger protection apparatus 30 is provided with each of the seats 10. The passenger protection apparatus 30 for the right seat 10 and the passenger protection apparatus 30 for the left seat 10 are symmetric. Hereinafter, the passenger protection apparatus 30 for the right seat 10 (the left side in FIG. 1) will be described as an example.

The seat 10 includes a seat cushion (seat bottom) 11 on which the hip and thighs of a passenger P rest, a seat back (backrest) 12 configured to recline, and a head rest (head portion) 13 configured to support the head of the passenger P.

<Configuration of Passenger Protection apparatus 30>

The passenger protection apparatus 30 is controlled by, for example, an ACU (airbag deployment control unit) and an ECU (electronic control unit), based on detection signals from a collision detector for detection and prediction of a collision of the vehicle 1. The passenger protection apparatus 30 includes an inflator 50 and an airbag body 100.

<Inflator 50>

The inflator 50 ignites explosives upon receiving an actuating signal sent based on the detection of a collision of the vehicle 1 by the collision detector, or the prediction of a collision, and generates gas by the chemical reaction due to combustion. The gas generated by the inflator 50 is injected into the airbag body 100. The inflator 50 includes a first inflator 51a and a second inflator 51b described later.

<Airbag Body 100>

The airbag body 100 has a pouch shape into which the gas is injected by the inflator 50. When the airbag body 100 is not actuated, it is compactly folded. The form of the airbag body 100 for storage will be described in detail later. To actuate the airbag body 100, the inflator 50 injects the gas into the folded airbag body 100, so that the airbag body 100 is deployed to surround the sitting position of the passenger P. For example, the cloth of the inward side of the airbag body 100 facing the passenger P is shorter than the cloth of the outward side opposite to the passenger P, so that the airbag body 100 can deploy to surround the passenger P. The airbag body 100 includes an inward cloth section facing the passenger P, and an outward cloth section approximately opposite to the inward cloth section. Each of the inward cloth section and the outward cloth section has a base end portion into which the gas is injected, and a leading end portion. The base end portion and the leading end portion of the inward cloth section are partially sewn on one another outside the airbag body 100 by a tether with an adjusted length. By this mean, it is possible to deploy the airbag body 100 to surround the passenger P. In the airbag body 100, a tether to control the width of the airbag body 100 is provided between the inward cloth section and the outward cloth section. The airbag body 100 has two configurations: configuration A where the base end portion of the inward cloth section is sewn on the leading end portion of the outward cloth section by a tether; and configuration B where the base end portion of the inward cloth section is sewn on the leading end portion of the outward cloth section by the tether at a position closer to the front end than the configuration A. Moreover, the tether is shorter than the length of the airbag body 100 deployed without using the tether, from the point of the outward cloth section facing the point at which the tether is sewn on the base end portion of the inward cloth section to the point at which the tether is sewn on the front end portion of the outward cloth section. By this means, it is possible to deploy the airbag body 100 to surround the passenger P. In this case, the inward cloth section may be shorter than the outward cloth section. Alternatively, the airbag body 100 may bent only in the configuration A, or may be bent in the configuration B in addition to the configuration A in multiple stages. Here, the airbag body 100 includes a first airbag body 101 and a second airbag body 102 described later.

When the passenger protection apparatuses 30 are not actuated, they are stored in a first storage case 41 and a second storage case 42, respectively. The first storage case 41 is provided on the left side of the seat 100 (the right side of the passenger P in FIG. 1), and the second storage case 42 is provided on the right side of the seat 100 (the left side of the passenger P in FIG. 1) in the traveling direction of the vehicle 1. The first inflator 51a and the first airbag body 101 are stored in the first storage case 41. Meanwhile, the second inflator 51b and the second airbag body 102 are stored in the second storage case 42.

Figure 3A:
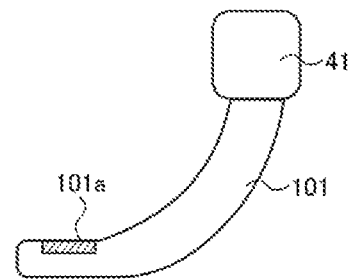
FIGS. 3A and 3C are top views illustrating a deploying airbag body.
Figure 3B:
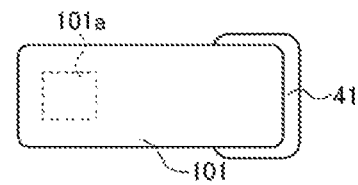
FIGS. 3B and 3D is front views illustrating a deploying airbag body.
Figure 3C:
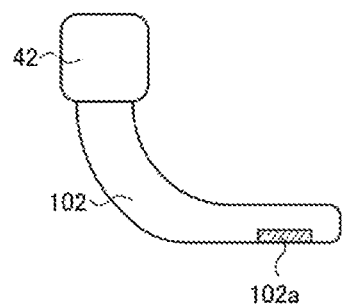
Figure 3D:
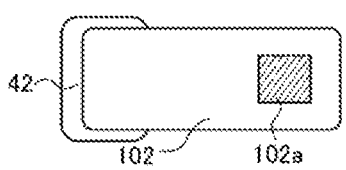

FIG. 3A is a top view illustrating the first airbag body 101 deploying when the passenger protection apparatus according to the embodiment is actuated. FIG. 3B is a front view illustrating the first airbag body 101 deploying when the passenger protection apparatus according to the embodiment is actuated. FIG. 3C is a top view illustrating the second airbag body 102 deploying when the passenger protection apparatus according to the embodiment is actuated. FIG. 3D is a front view illustrating the second airbag body 102 deploying when the passenger protection apparatus according to the embodiment is actuated.

<First Inflator 51a>

The first inflator 51a is configured to generate gas upon receiving an actuating signal sent based on the detection of the collision detector, and to supply the generated gas to the first airbag body 101 to expand the first airbag body 101.

<Second Inflator 51b>

Like the first inflator 51a, the second inflator 51b is configured to generate gas upon receiving an actuating signal sent based on the detection of the collision detector, and to supply the generated gas to the second airbag body 102 to expand the second airbag body 102.

<First Airbag Body 101>

The first airbag body 101 is configured to expand and deploy by the gas injected from the first inflator 51a. One end (fixed side) of the first airbag body 101 is supported by the first storage case 41, and, when the first airbag body 101 is actuated, the other end (deployment side) is deployed to surround the sitting position of the passenger P. The first airbag body 101 includes an adhesive area 101a on which adhesive is applied. The adhesive area 101a is provided on the inward surface facing the passenger P (facing the rear side of the vehicle 1) near the leading end portion (deployment side) of first airbag body 101. That is, adhesive is applied to a predetermined portion of the first airbag body 101, and when the first airbag body 101 is deployed, the predetermined portion adheres to an adherend. This adhesive has no adhesive force or a low adhesive force at ordinary temperatures, but increases the adhesive force when the temperature is raised.

<Second Airbag Body 102>

The second airbag body 102 is configured to expand and deploy by the gas injected from the second inflator 51b. One end (fixed side) of the second airbag body 102 is supported by the second storage case 42, and, when the second airbag body 102 is actuated, the other end (deployment side) is deployed to surround the sitting position of the passenger P. The second airbag body 102 includes an adhesive area 102a on which adhesive is applied. The adhesive area 102a is provided on the outward surface opposite to the passenger P (facing the front side of the vehicle 1) near the leading end portion (deployment side) of the second airbag body 102. That is, like the first airbag body 101, adhesive is applied to a predetermined portion of the second airbag body 102, and when the second airbag body 102 is deployed, the predetermined portion adheres to an adherend.

Like the adhesive of the first airbag body 101, this adhesive has no adhesive force or a low adhesive force at ordinary temperatures, but increases the adhesive force when the temperature is raised. The adhesive applied to the first airbag body 101 and the adhesive applied to the second airbag body 102 may be different in property. For example, the adhesive applied to the first airbag body 101 may exert its adhesive force at a high temperature, and the adhesive applied to the second airbag body 102 may exert its adhesive force at a lower temperature than the first airbag body 101.

Here, by actuating the second inflator 51b slightly earlier than when the first inflator 51a is actuated, the second airbag body 102 is deployed earlier than when the first airbag body 101 is deployed. By this means, the first airbag body 101 and the second airbag body 102 can successfully adhere to one another at a desired position.

In addition, with the embodiment, each of the first airbag body 101 and the second airbag body 102 includes the adhesive area on which adhesive is applied, but this is by no means limiting. One of the first airbag body 101 and the second airbag body 102 may include the adhesive area, and the other may not include the adhesive area and therefore adhesive is not applied to the other. In this case, one of the airbag body 101 and the airbag body 102 which does not include the adhesive area has a corresponding area made of a material or formed in a shape which can easily adhere to the adhesive area. By this means, the first airbag body 101 and the second airbag body 102 can more successfully adhere to one another.

<Form of Airbag Body 100 for Storage>

Figure 4:
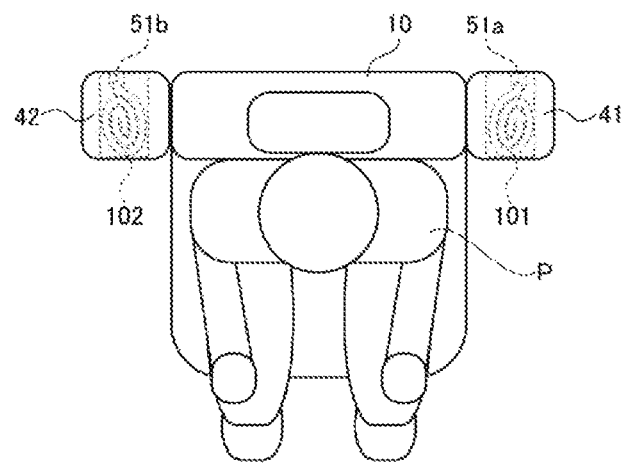
FIG. 4 is a top view illustrating a seat and airbag bodies rolled and stored.
Figure 5A:
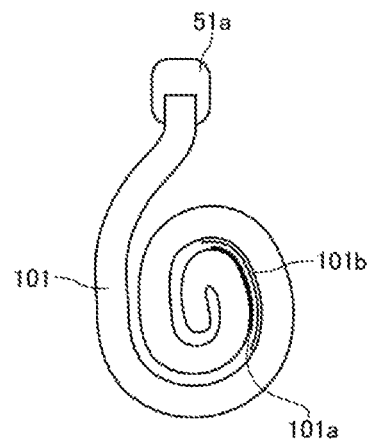
FIGS. 5A-5B are top views illustrating an airbag body rolled and stored.
Figure 5B:
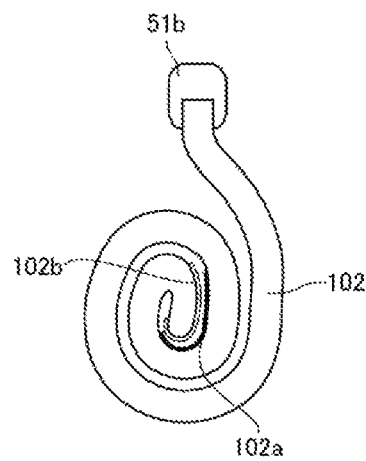

Next, the form of the airbag body 100 for storage will be described. FIG. 4 is a top view illustrating the seat 10 and the airbag bodies 100 rolled and stored. FIGS. 5A-5B are top views illustrating the airbag body 100 rolled and stored.

As illustrated in FIG. 4, when the first airbag body 101 is not deployed, it is deflated, and rolled for storage in the first storage case 41. As illustrated in FIG. 5A, the first airbag body 101 includes the adhesive area (adhesive surface) 101a on which adhesive is applied on the outward surface of the rolled first airbag body 101 at a predetermined position. In addition, the first airbag body 101 includes a peel-off area (peel-off surface) 101b facing the adhesive area 101a which easily peels off from the adhesive area 101a, on the inward surface of the rolled first airbag body 101. Here, the peel-off area 101b of the first airbag body 101 is wider than the adhesive area 101a.

The second airbag body 102 is rolled and stored in the second storage case 42. The second airbag body 102 includes the adhesive area (adhesive surface) 102a on which adhesive is applied on the inward surface of the rolled second airbag body 102 at a predetermined position. In addition, the second airbag body 102 includes a peel-off area (peel-off surface) 102b facing the adhesive area 102a which easily peels off from the adhesive area 102a, on the outward surface of the rolled second airbag body 102. Here, like the peel-off area 101b of the first airbag body 101, the peel-off area 102b of the second airbag body 102 is wider than the adhesive area 102a.

As described above, when the first airbag body 101 is stored, the adhesive area 101a on which adhesive is applied faces the peel-off area 101b. By this mean, when the first airbag body 101 is deployed, it is possible to prevent the adhesive area 101a and the peel-off area 101b from adhering to one another, and to ease the separation of the adhesive area 101a from the peel-off area 101b. Consequently, it is possible to successfully deploy the first airbag body 101. Moreover, the adhesive area 101a is provided on the outward surface of the rolled first airbag body 101, and therefore the gas injected from the first inflator 51a is applied to the adhesive area 101a at a high pressure. Consequently, it is possible to improve the adhesive force of the adhesive.

Like the first airbag body 101, when the second airbag body 102 is stored, the adhesive area 102a faces the peel-off area 102b. By this means, when the second airbag body 102 is deployed, it is possible to easily separate the adhesive area 102a from the peel-off area 102b. Consequently, it is possible to successfully deploy the second airbag body 102. Moreover, the peel-off area 102b is provided on the outward surface of the rolled second airbag body 102, and therefore it is possible to easily separate the peel-off area 102b from the part of the second airbag body 102 located outside the peel-off area 102b. Consequently, it is possible to easily deploy the second airbag body 102.

Moreover, the peel-off area 101b of the first airbag body 101 is wider than the adhesive area 101a, and therefore the peel-off area 101b can be easily peeled off from the adhesive area 101a. Likewise, the peel-off area 102b of the second airbag body 102 is wider than the adhesive area 102a, and therefore the peel-off area 102b can be easily peeled off from the adhesive area 102a.

Further, with the embodiment, the adhesive area 101a is provided on the outward surface of the rolled first airbag body 101, and the peel-off area 102b is provided on the outward surface of the rolled second airbag body 102. By this means, the second airbag body 102 can be readily deployed, and the first airbag body 101 and the second airbag body 102 can firmly adhere to one another at the adhesive area 101a of the first airbag body 101.

With the embodiment, the adhesive area 101a is provided on the outward surface of the rolled first airbag body 101, and the peel-off area 101b is provided on the inward surface of the rolled first airbag body 101; and the adhesive area 102a is provided on the inward surface of the rolled second airbag body 102, and the peel-off area 102b is provided on the outward surface of the rolled second airbag body 102. However, this is by no means limiting, and the adhesive areas 101a and 102a may be provided on the outward surfaces of the rolled first airbag body 101 and the rolled second airbag body 102, respectively; and the peel-off areas 101*b* and 102*b* may be provided on the inward surfaces of the rolled first airbag body 101 and the rolled second airbag body 102, respectively. Alternatively, the adhesive areas 101*a* and 102*a* may be provided on the inward surfaces of the rolled first airbag body 101 and the rolled second airbag body 102, respectively; and the peel-off areas 101*b* and 102*b* may be provided on the outward surfaces of the rolled first airbag body 101 and the rolled second airbag body 102, respectively.

<Operation of Passenger Protection Apparatus 30>

In the passenger protection apparatus 30, when the collision detector detects or predicts a collision of the vehicle 1, an actuating signal is first sent to the second inflator 51*b* to actuate the second inflator 51*b*, and next an actuating signal is sent to the first inflator 51*a* to actuate the first inflator 51*a*.

Upon receiving the actuating signal sent based on the detection or prediction of a collision by the collision detector, the second inflator 51*b* generates gas and supplies the gas to the second airbag body 102. When the second airbag body 102 is supplied with the gas from the second inflator 51*b*, the second airbag body 102 expands and protrudes from the second storage case 42. Then, the second airbag body 102 spreads from the right to surround the passenger P and deploys in front of the passenger P.

Next, upon receiving an actuating signal sent based on the detection or prediction of a collision by the collision detector, the first inflator 51*a* generates gas and supplies the gas to the first airbag body 101. When the first airbag body 101 is supplied with the gas from the first inflator 51*a*, the first airbag body 101 expands and protrudes from the first storage case 41. At this time, like the second airbag body 102, the adhesive area 101*a* and the peel-off area 101*b* face one another, and therefore it is possible to successfully deploy the first airbag body 101. Then, the first airbag body 101 spreads from the left to surround the passenger P and deploys in front of the passenger P.

Then, the adhesive applied to the adhesive area 102*a* of the second airbag boy 102 is melted by the heat of the gas inputted from the second inflator 51*b*, and then the adhesive area 102*a* of the second airbag body 102 adheres to the inward surface of the first airbag body 101 facing the rear side of the vehicle 1. Also, the adhesive applied to the adhesive area 101*a* of the first airbag body 101 is melted by the heat of the gas inputted from the first inflator 51*a*, and then the adhesive area 101*a* of the first airbag body 101 adheres to the outward surface of the second airbag body 102 facing the front side of the vehicle 1.

As described above, in the passenger protection apparatus 30 according to the embodiment, the adhesive exerts its adhesive function by the heat of the gas from the inflator 50, so that the first airbag body 101 and the second airbag body 102 can adhere to one another. Therefore, it is possible to surely hold the passenger P on the seat 10 in a collision, and cope with various types of collisions in different directions, and consequently to improve the protection performance. In addition, the adhesive area 101*a* and the peel-off area 101*b* of the first airbag body 101 face one another, and therefore it is possible to prevent the adhesive from being applied to an undesired region before the first airbag body 101 is deployed. Consequently, it is possible to successfully deploy the first airbag body 101. Like the first airbag body 101, the adhesive area 102*a* and the peel-off area 102*b* of the second airbag body 102 face one another, and therefore it is possible to prevent the adhesive from being applied to an undesired region before the second airbag body 102 is deployed. Consequently, it is possible to successfully deploy the second airbag body 102.

Here, in the passenger protection apparatus 30 according to the embodiment, adhesive is applied to the inward surface of the first airbag body 101 facing the passenger P and the outward surface of the second airbag body 102 opposite to the passenger P, but this is by no means limiting. Adhesive may be applied to the outward surface of the first airbag body 101 opposite to the passenger P, and the inward surface of the second airbag body 102 facing the passenger P. In this case, it is preferred that the first airbag body 101 is first deployed, and next the second airbag body 102 is deployed. Alternatively, adhesive may be applied to both the inward surface facing the passenger P and the outward surface opposite to the passenger P of each of the first airbag body 101 and the second airbag body 102. In this case, either of the first airbag body 101 and the second airbag body 102 may be deployed first, or they may be deployed at the same time.

<One-Side Airbag>

Figure 6:
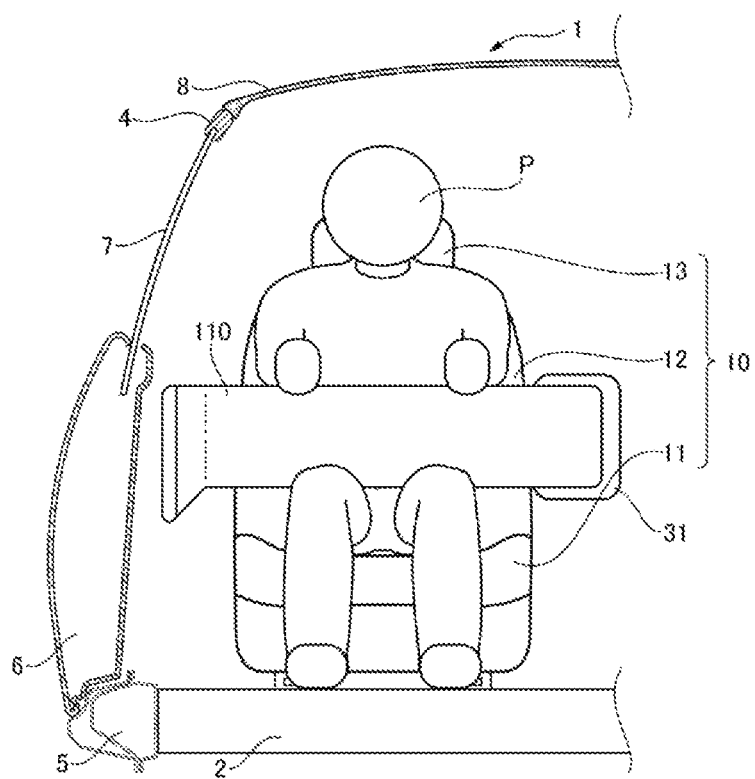
FIG. 6 is a cross-sectional view schematically illustrating a vehicle equipped with a passenger protection apparatus including an airbag body deploying from one side of a passenger.

In addition, with the above-described embodiment, the first airbag body 101 of the passenger protection apparatus 30 is provided on the left side of the passenger P, and the second airbag body 102 of the passenger protection apparatus 30 is provided on the right side of the passenger P, but this is by no means limiting. The airbag body may be provided on only one side of the passenger P. To be more specific, as illustrated in FIG. 6, a passenger protection apparatus 31 may be provided on the left side of the seat 10 (on the right side of the passenger P in FIG. 6), and an inflator and an airbag body 110 may be provided in the passenger protection apparatus 31.

Upon receiving an actuating signal sent based on the detection of the collision detector, the inflator supplies gas to the airbag body 110. When the airbag body 100 is not actuated, it is compactly folded. An adhesive area is provided near the leading end portion of the airbag body 110, and adhesive is applied to the adhesive area. A peel-off area (peel-off surface) is provided on one surface of the airbag body 110 facing the adhesive area when the airbag body 110 is stored. The peel-off area is easily peeled off from the adhesive area. Then, when the airbag body 110 is supplied with the gas from the inflator, the airbag body 110 is deployed to surround the sitting position of the passenger P. Then, the adhesive is melted by the heat of the gas from the inflator, so that the adhesive area adheres to the front door 6.

By this means, in the passenger protection apparatus 31, the adhesive exerts its adhesive function by the heat of the gas from the inflator, and therefore it is possible to surely hold the passenger P on the seat 10, and consequently to improve the protection performance. In addition, the adhesive area and the peel-off area of the airbag body 110 face one another, and therefore it is possible to successfully deploy the airbag body 110.

<Airbag Body Folded in a Zigzag Manner for Storage>

Figure 7A:
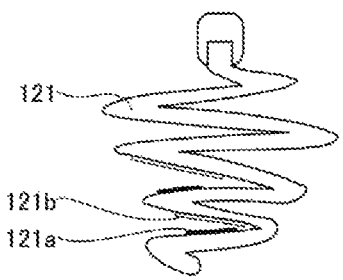
FIGS. 7A-7C are top views illustrating an airbag body folded in a zigzag manner.
Figure 7B:
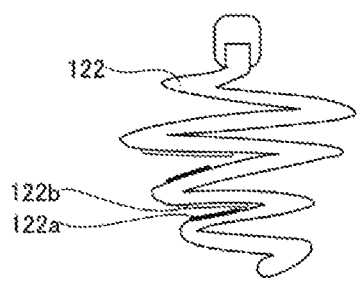

Next, a configuration where an airbag body is folded in a zigzag manner for storage will be described. FIGS. 7A-7B are top views illustrating an airbag body folded in a zigzag manner for storage.

Figure 7C:
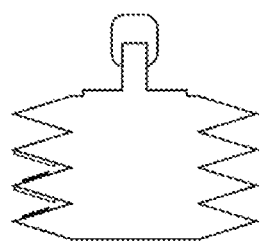

As illustrated in FIGS. 7A-7C, a first airbag body 121 is folded in a zigzag manner and stored in the first storage case. An adhesive area 121*a* is provided on one surface of each of folded-down portions of the first airbag body 121 at a predetermined position. In addition, a peel-off area (peel-off surface) 121*b* is provided on the other surface of each of the folded-down portions facing the adhesive area 121a to easily peel off from the adhesive area 121a. Here, the peel-off area 121b of the first airbag body 121 is wider than the adhesive area 121b.

A second airbag body 122 is folded in a zigzag manner and stored in the second storage case. Like the first airbag body 121, an adhesive area 122a is provided on one surface of each of folded-down portions of the second airbag body 122. In addition, a peel-off area (peel-off surface) 122b is provided on the other surface of each of the folded-down portions facing the adhesive area 122a to easily peel off from the adhesive area 122a. Like the first airbag body 121, the peel-off area 122b of the second airbag body 122 is wider than the adhesive area 122a.

As described above, when the first airbag body 121 is stored, the adhesive area 121a and the peel-off area 121b face one another. Therefore, when the first airbag body 121 is deployed, it is possible to prevent the adhesive area 121a and the peel-off area 121b from adhering to one another, and to ease the separation of the adhesive area 121a from the peel-off area 121b. Consequently, it is possible to successfully deploy the first airbag body 121.

In addition, like the first airbag body 121, when the second airbag body 122 is stored, the adhesive area 122a and the peel-off area 122b face one another. Therefore, when the second airbag body 122 is deployed, it is possible to ease the separation of the adhesive area 122a from the peel-off area 122b. Consequently, it is possible to successfully deploy the first airbag body 122.

Here, with the embodiment, the adhesive area 121a is provided on the front end side of the folded-down portion of the first airbag body 121, and the peel-off area 121b is provided on the rear end side of the folded-down portion. However, this is by no means limiting, and the adhesive area 121a may be provided on the rear end side and the peel-off area 121b may be provided on the front end side. Alternatively, part of the adhesive area 121a may be provided on the front end side, and the remaining adhesive area 121a may be provided on the rear end side. The same applies to the second airbag body 122. In addition, the layout of the adhesive area 121a, 122a and the peel-off area 121b, 122b may be different between the first airbag body 121 and the second airbag body 122.

With the embodiment, the airbag body is folded in a zigzag manner for storage, but this is by no means limiting. The airbag body may be accordion-folded as illustrated in FIG. 7C. In this case, the adhesive area may be provided on one surface of a pleat of the accordion-folded airbag body, and the peel-off area may be provided on the other surface facing the adhesive area. By this means, it is possible to easily unfold the airbag body during the deployment when the passenger protection apparatus is actuated, and therefore to successfully deploy the airbag body and improve the passenger protection performance.

<Split Leading End Portion>

Figure 8A:
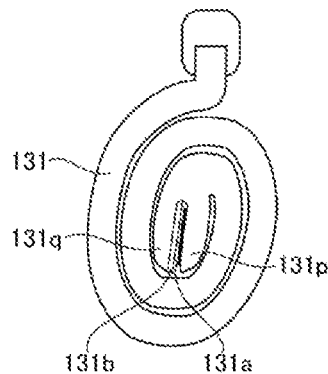
FIGS. 8A-C are top views illustrating an airbag body having a split leading end portion.
Figure 8B:
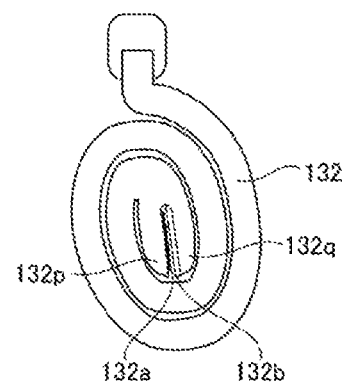
Figure 8C:
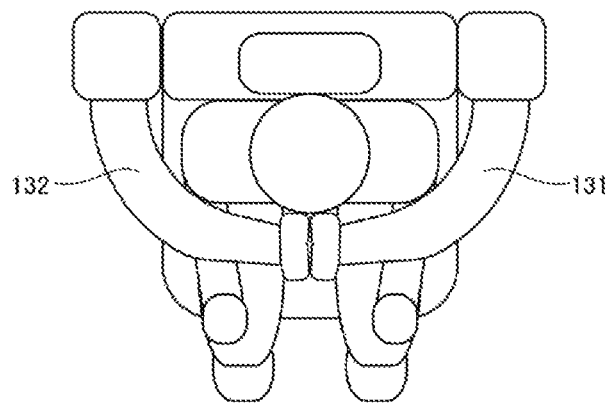

Next, a configuration where the leading end portion of the airbag body is split will be described. FIGS. 8A-8C are top views illustrating an airbag body having a split leading end portion.

As illustrated in FIG. 8A, a first airbag body 131 is rolled and stored in the first storage case. The leading end portion of the first airbag body 131 is split into a first end portion 131p and a second end portion 131q which face one another when the first airbag body 131 is stored.

An adhesive area 131a is provided on the first end portion 131p of the first airbag body 131. Adhesive is applied to the adhesive area 131a. Meanwhile, a peel-off area 131b is provided on the second end portion 131q of the first airbag body 131 to easily peel off from the adhesive area 131a.

As illustrated in FIG. 8B, a second airbag body 132 is rolled and stored in the second storage case. Like the first airbag body 131, the leading end portion of the second airbag body 132 is split into a first end portion 132p and a second end portion 132q which face one another when the second airbag body 132 is stored.

An adhesive area 132a is provided on the second end portion 132p of the second airbag body 132. Adhesive is applied to the adhesive area 132a. Meanwhile, a peel-off area 132b is provided on the second end portion 132q of the second airbag body 132 to easily peel off from the adhesive area 132a.

As described above, the adhesive area 131a is provided on the first end portion 131p of the first airbag body 131, and the peel-off area 131b provided on the second end portion 131q faces the adhesive area 131a. Therefore, the first end portion 131p and the second end portion 131q can be easily separated from one another and open when the first airbag body 131 is deployed. Likewise, the adhesive area 132a is provided on the first end portion 132p of the second airbag body 132, and the peel-off area 132b provided on the second end portion 132q faces the adhesive area 132a. Therefore, the first end portion 132p and the second end portion 132q can be easily separated from one another and open when the second airbag body 132 is deployed.

Accordingly, as illustrated in FIG. 8C, the split leading end portions of the first airbag body 131 and the second airbag body 132 open, respectively, to allow the first end portion 131p of the first airbag body 131 and the first end portion 132p of the second airbag body 132 to adhere to one another. By this means, it is possible to surely hold the passenger P, and improve the protection performance.

<Adhesive Area on Each End Portion>

Figure 9A:
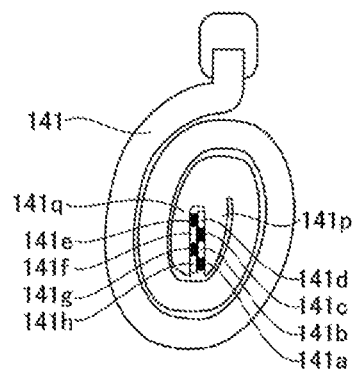
FIGS. 9A-9B illustrate an airbag body having a first end portion and a second end portion with adhesive regions.
Figure 9B:
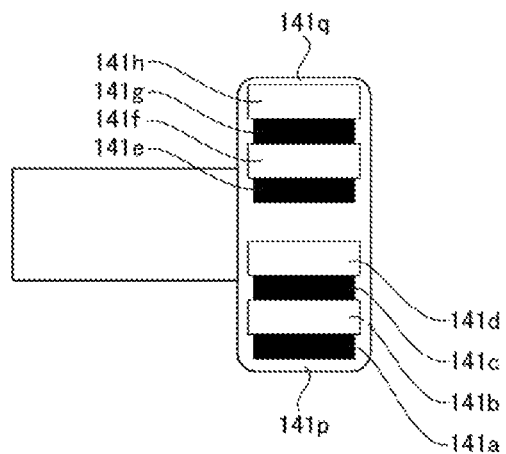

Next, a configuration where the adhesive areas are provided on a first end portion and a second end portion will be described. FIGS. 9A-9B illustrate an airbag body including a first end portion and a second portion with adhesive areas. FIG. 9A is a top view illustrating the stored airbag body. FIG. 9B illustrates the airbag body when the end portions open.

As illustrated in FIG. 9A, a first airbag body 141 is rolled and stored in the first storage case. The leading end portion of the first airbag body 141 is split into a first end portion 141p and a second end portion 141q which face one another when the first airbag body 141 is stored.

Adhesive areas 141a and 141c on which adhesive is applied, and peel-off areas 141b and 141d which easily peel off from the adhesive areas 141a and 141c are provided on the first end portion 141p of the first airbag body 141. Meanwhile, adhesive areas 141e and 141g on which adhesive is applied, and peel-off areas 141f and 141h which easily peel off from the adhesive areas 141e and 141g are provided on the second end portion 141q of the first airbag body 141.

Here, as illustrated in FIG. 9A, the adhesive area 141a of the first end portion 141p and the peel-off area 141h of the second end portion 141q face one another when the first airbag body 141 is stored. Likewise, the adhesive area 141c of the first end portion 141p faces the peel-off area 141f of the second end portion 141q, the peel-off area 141b faces the adhesive area 141g, and the peel-off area 141d faces the adhesive area 141e. The same applies to the second airbag body.

Therefore, when the airbag body 141 and the second airbag body are deployed, the adhesive areas 141a, 141c, 141e, and 141g of the first airbag body 141 can adhere to the corresponding adhesive areas of the second airbag body. By this means, it is possible to surely hold the passenger P and improve the protection performance. Moreover, the adhesive areas and the peel-off areas face each other when the airbag bodies are stored, and consequently it is possible to successfully deploy the first airbag body 141 and the second airbag body at the actuation of the passenger protection apparatus.

<One Side-Airbag with Split Leading End Portion>

Figure 10A:
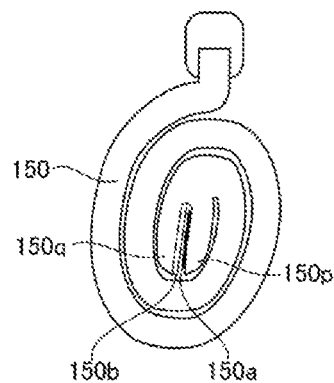
FIGS. 10A-10B are top views illustrating an airbag body deploying from one side of the passenger and having a split leading end portion.
Figure 10B:
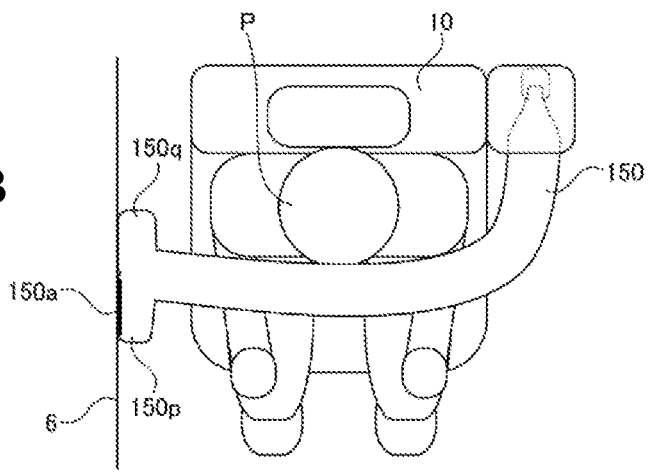

Next, a passenger protection apparatus including an airbag body deploying from one side of the passenger P and having a split leading end will be described. FIGS. 10A-10B are top views illustrating an airbag body deploying from one side of the passenger P and having a split leading end portion.

As illustrated in FIG. 10A, an airbag body 150 is rolled and stored in a storage case. The leading end portion of the airbag body 150 is split into a first end portion 150p and a second end portion 150q which face one another when the airbag body 150 is stored.

An adhesive area 150a is provided on the first end portion 150p of the airbag body 150. Adhesive is applied to the adhesive area 150a. Meanwhile, a peel-off area 150b is provided on the second end portion 150q of the airbag body 150 to easily peel off from the adhesive area 150a.

As described above, the adhesive area 150a is provided on the first end portion 150p of the airbag body 150, and the peel-off area 150b provided on the second end portion 150q faces the adhesive area 150a. Therefore, the first end portion 150p and the second end portion 150q can be easily separated from one another and open when the airbag body 150 is deployed.

Then, when the gas is supplied to the airbag body 150, the airbag body 150 is deployed to surround the sitting position of the passenger P, and the first end portion 150p opens to allow the adhesive area 150a provided on the first end portion 150p to adhere to the front door 6.

By this means, the airbag body 150 surely holds the passenger P on the seat 10, and therefore it is possible to improve the protection performance. Moreover, the adhesive area 150a and the peel-off area 150b of the airbag body 150 face one another, and therefore it is possible to successfully open the split leading end portion of the airbag body 150.

With the above-described embodiment, the adhesive area on which adhesive is applied and the peel-off area face one another. Therefore, it is possible to successfully deploy the airbag body at the actuation of the passenger protection apparatus, and consequently to surely hold the passenger P and improve the protection performance.

The invention claimed is:

1. A passenger protection apparatus for a vehicle, the apparatus comprising:
an inflator configured to generate gas upon receiving a predetermined actuating signal; and
an airbag body folded and configured to deploy by supplying the gas from the inflator to the airbag body,
the airbag body comprising a predetermined area on which adhesive is applied, the predetermined area adhering to an adherend when the airbag body is deployed,
wherein when the airbag body is not deployed, the airbag body is stored in a deflated and bound state, and a surface facing the predetermined area when the airbag body is stored is a peel-off surface on which an adhesive force of the adhesive is lost, and wherein:
the airbag body is stored in a rolled state with a free end split formed in the airbag body that is compressed shut during airbag body storage with the peel-off surface and the predetermined area in contact.

2. The passenger protection apparatus for a vehicle according to claim 1, wherein:
when the airbag body is in a deployed state, the peel-off surface remains retained on the airbag body and in a position farther spaced from the predetermined area than when in a storage state.

3. The passenger protection apparatus for a vehicle according to claim 1, wherein:
the peel-off surface is greater in area than the predetermined area which the peel-off surface contacts during storage.

4. A passenger protection apparatus for a vehicle, the apparatus comprising:
an inflator configured to generate gas upon receiving a predetermined actuating signal; and
an airbag body folded and configured to deploy by supplying the gas from the inflator to the airbag body,
the airbag body comprising a predetermined area on which adhesive is applied, the predetermined area adhering to an adherend when the airbag body is deployed,
wherein when the airbag body is not deployed, the airbag body is stored in a deflated and bound state, and a surface facing the predetermined area when the airbag body is stored is a peel-off surface on which an adhesive force of the adhesive is lost, and wherein:
the airbag body has a sequence of peel-off and predetermined area regions on a first surface portion of the airbag and an opposing set of predetermined area and peel-off regions on another surface portion of the airbag body, with each peel-off region on the airbag body being compressed against an opposing one of the predetermined area regions on the airbag body during airbag body storage.

5. The passenger protection apparatus for a vehicle according to claim 4, wherein:
the airbag body is stored in a rolled state; and
the adhesive is applied to one of an outward surface and an inward surface of the rolled airbag body, and the other surface is the peel-off surface.

6. The passenger protection apparatus for a vehicle according to claim 4, wherein:
the airbag body is stored with at least part of the airbag body being folded; and
one surface of the folded-down part is an adhesive surface on which the adhesive is applied, and the other surface facing the one surface is the peel-off surface.

7. The passenger protection apparatus for a vehicle according to claim 4, wherein:
the airbag body comprises a first end portion and a second end portion facing one another when the airbag body is stored, and to separate from one another when the airbag body is deployed;
the adhesive is applied to a surface of the first end portion facing the second end portion when the airbag body is stored; and
a surface of the second end portion facing the first end portion when the airbag body is stored is the peel-off surface.

8. The passenger protection apparatus for a vehicle according to claim 4, wherein:
the airbag body is stored in a compressed zig-zag folded state.

9. The passenger protection apparatus for a vehicle according to claim 4, wherein:
the airbag body is stored in a compressed accordion configuration.

10. A passenger protection apparatus for a vehicle, the apparatus comprising:
an inflator configured to generate gas upon receiving a predetermined actuating signal; and
an airbag body folded and configured to deploy by supplying the gas from the inflator to the airbag body,
the airbag body comprising a predetermined area on which adhesive is applied, the predetermined area adhering to an adherend when the airbag body is deployed,
wherein when the airbag body is not deployed, the airbag body is stored in a deflated and bound state, and a surface facing the predetermined area when the airbag body is stored is a peel-off surface on which an adhesive force of the adhesive is lost, and wherein:
the airbag body comprises
adhesive areas on each of which adhesive is applied, the adhesive areas being configured to adhere to respective adherends when the airbag body is deployed, and
peel-off areas on each of which an adhesive force of the adhesive is lost;
the adhesive areas and the peel-off areas are disposed alternately one by one on surfaces of the airbag body; and
when the airbag body is not deployed, the airbag body is stored in a deflated and bound state with the surfaces facing each other.

11. The passenger protection apparatus for a vehicle according to claim 10, wherein
the airbag body is stored in a rolled state;
the adhesive areas comprise outer adhesive areas, inner adhesive areas, outer peel-off areas, and inner peel-off areas, the outer adhesive areas and the outer peel-off areas being disposed outward of the rolled airbag body, the inner adhesive areas and inner outer peel-off areas being disposed inward of the rolled airbag body; and
the outer adhesive areas, the inner adhesive areas, the outer peel-off areas, and the inner peel-off areas are disposed in such a manner the outer adhesive areas face the inner peel-off areas and the inner adhesive areas face the outer peel-off areas.

12. The passenger protection apparatus for a vehicle according to claim 10, wherein:
the airbag body is stored with at least part of the airbag body being folded; and
the adhesive areas and the peel-off areas are disposed respectively on portions of the surfaces, the portions facing each other at the folded-down part.

13. The passenger protection apparatus for a vehicle according to claim 10, wherein
the airbag body comprises a first end portion and a second end portion facing one another when the airbag body is stored, and to separate from one another when the airbag body is deployed;
the adhesive areas comprise a first adhesive area and a second adhesive area, the first adhesive area being disposed on the first end portion, the second adhesive area being disposed on the second end portion;
the peel-off areas comprise a first peel-off area and a second peel-off area, the first peel-off area being disposed on the first end portion, the second peel-off area being disposed on the second end portion; and
when the airbag body is stored, the first adhesive area and the second peel-off area face each other, and the first peel-off area and the second adhesive area face each other.

* * * * *